United States Patent Office 3,313,783
Patented Apr. 11, 1967

3,313,783
PROCESS FOR PREPARATION OF
POLYBENZIMIDAZOLES
Yoshio Iwakura, Suginami-ku, Keikichi Uno, Kitatama-gun, and Yoshio Imai, Suginami-ku, Tokyo, Japan, assignors to Teijin Limited, Osaka, Japan, a corporation of Japan
No Drawing. Filed June 11, 1963, Ser. No. 286,946
Claims priority, application Japan, July 20, 1962,
37/29,861
5 Claims. (Cl. 260—78)

This invention relates to a novel process for preparation of polybenzimidazoles. More particularly, the invention relates to a process for preparation of polybenzimidazoles by solution polycondensation of at least one acid salt of aromatic tetramine together with at least one dicarboxylic acid or its derivative in polyphosphoric acid by heating.

Heretofore, as a process for preparation of polybenzimidazoles, that of direct melt polycondensation of an aromatic tetramine with a dicarboxylic acid derivative at high temperature is known (cf. French Patent No. 1,303,-849 and Journal of Polymer Science, vol. 50, pages 511–539).

However in practice, by said conventional process, aromatic tetramines stored in form of inorganic acid salts are first converted to free amines by neutralization, and then are directly melt-polycondensed with dicarboxylic acid derivatives. At that time, because free amines are unstable compounds and very sensitive to oxidation, the freeing of amines from the inorganic acid salts by neutralization and the subsequent reactions must be carried out under the strict absence of oxygen. Thus, the operations are inevitable very complicated.

We carried out an extensive research for a process wherein the inorganic acid salts of aromatic tetramines which are very stable may be put to the reaction as they are, and as the result reached the subject invention.

Therefore, one object of this invention is to provide a process for preparation of polybenzimidazoles directly from acid salts, particularly inorganic acid salts, of aromatic tetramines.

Another object of this invention is to provide a novel condensing agent useful in preparation of polybenzimidazoles.

Still other objects of this invention will become clear from reading the rest of the specification.

According to this invention, at least one inorganic acid salt of aromatic tetramine and at least one dicarboxylic acid or derivative thereof are heated and polycondensed in polyphosphoric acid to produce polybenzimidazoles.

Some examples of the aromatic tetra-primary amines wherein two groups each of primary amines are present at the ortho-position of the aromatic nucleus used in this invention are: 1,2,4,5-tetramino benzene, 2,3,6,7-tetramino naphthalene, 3,4,3',4'-tetramino diphenyl, 3,4,3',4'-tetramino diphenylether, 3,4,3',4'-tetramino diphenylthioether, 3,4,3',4'-tetramino diphenylsulfone, 3,4,3',4'-tetramino diphenylmethane, 3,4,3',4'-tetramino diphenylethane, and 3,4,3',4'-tetramino diphenyl-2,2-propane.

Also the inorganic acids to form salts together with these aromatic tetra-primary amines wherein two groups each of primary amines are present at the ortho-position of the aromatic nucleus may be any which can form salts with said aromatic tetra-primary amines, for example, hydrochloric, nitric, sulfuric, and phosphoric acids.

Further, with organic acids it is generally difficult to form salts of said aromatic tetra-primary amines. Therefore in this invention normally inorganic acid salts of the aromatic tetra-primary amines are used. However any organic acid which does not participate in the reaction of this invention and which can form salts with the aromatic tetra-primary amines can of course be used.

The dicarboxylic acids to be used in this invention may be any aromatic, aliphatic, or cycloaliphatic dicarboxylic acids. Examples of such are, for example, as follows:

Aromatic dicarboxylic acids—Isophthalic, terephthalic, 4,4'-diphenyl dicarboxylic, 3,3'-diphenyl dicarboxylic, 2,2'-diphenyl dicarboxylic, 4,4'-diphenylether dicarboxylic, 3,3'-diphenylether dicarboxylic, 4,4'-diphenylthioether dicarboxylic, 3,3'-diphenylthioether dicarboxylic, 4,4'-diphenylmethane dicarboxylic, 3,3'-diphenylmethane dicarboxylic, 4,4'-diphenyl-2,2-propane dicarboxylic, 3,3'-diphenyl-2,2-propane dicarboxylic, 4,4'-diphenylsulfone dicarboxylic, 3,3'-diphenylsulfone dicarboxylic, 1,4-naphthalene dicarboxylic, 1,5-naphthalene dicarboxylic, 1,6-naphthalene dicarboxylic, 2,6-naphthalene dicarboxylic, 2,5-furan dicarboxylic, 2,4-pyridine dicarboxylic, 2,5-pyridine dicarboxylic, 2,6-pyridine dicarboxylic, and 3,5-pyridine dicarboxylic acids.

Aliphatic dicarboxylic acids—Oxalic, adipic, azelaic, sebacic, undecamethylene dicarboxylic, eicosamethylene dicarboxylic, and fumaric acids.

Cycloaliphatic dicarboxylic acids—1,3-cyclohexane dicarboxylic and 1,4-cyclohexane dicarboxylic acids.

In place of said dicarboxylic acids, derivatives of those dicarboxylic acids which can react with amino group of said aromatic tetramines to form therewith carboamide group (—NHCO—) may be used. Examples of such derivatives are aliphatic, cycloaliphatic, and aromatic esters, acid halides, acid amides, acid hydrazides, and nitriles of aforesaid dicarboxylic acids.

According to this invention, at least one of aforesaid inorganic acid salts of aromatic tetra-primary amines wherein two groups each of primary amines are present at the ortho-position of the aromatic nucleus and at least one of the dicarboxylic acids or derivatives thereof are together heated to perform the following reaction.

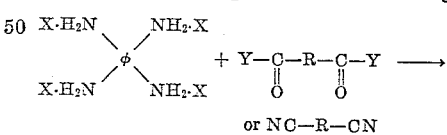

or NC—R—CN

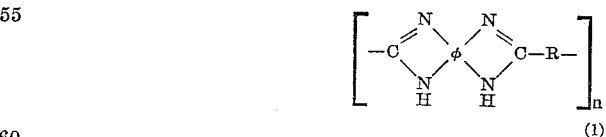

(1)

wherein X stands for HCl, HNO$_3$, ½H$_2$SO$_4$, ⅓H$_3$PO$_4$;

Y stands for OH, OR' (R' stands for alkyl or aryl), Cl, Br, I, $NH_2$, or $NHNH_2$; $\phi$ is an aromatic nucleus wherein amino group is present at ortho-position; and R is a divalent organic group.

As can be understood from the above reaction formula, when an inorganic acid salt of aromatic tetramine and a dicarboxylic acid are heated and polycondensed, water is released, and when a derivative of a dicarboxylic acid is used in place of the acid, depending on the type of the derivative, water and alcohol, water and hydrogen halide, or water and amine, etc., are released.

According to the invention, it is preferred to use the dicarboxylic acid or its derivative at such a ratio as around one mol per mol of the inorganic acid salt of an aromatic tetramine. The amount of decarboxylic acid or its derivative, however, is not necessarily very close to 1 mol, but can be varied within the range of 0.8–1.2 mols.

Again the polyphosphoric acid used in this invention may be obtained, for example, by adding phosphorous pentoxide to ortho-phosphoric acid and heating the same to about 300° C.

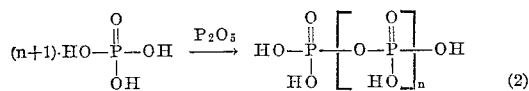
(2)

wherein $n$ represents a positive integer greater than zero.

Polyphosphoric acid is said to be a mixture of the compounds of the above general formula having different values of $n$. In this invention, any polyphosphoric acid of the above formula wherein average $n$ is greater than zero, and moreover which is a liquid at 100–250° C., the reaction temperatures of this invention, may be used. Generally, such polyphosphoric acid has an $n$ greater than zero but not greater than six in the above formula 2. And ortho-phosphoric acid is obtained as in the following formula.

$$P_2O_5 + 3H_2O \rightarrow 2H_3PO_4 \qquad (3)$$

When the quantitative ratio of $P_2O_5$ to that of water ($H_2O$) in the reaction exceeds the ratio shown in the above reaction Formula 3, polyphosphoric acids usable for this invention are obtained, for example, as in the following formula.

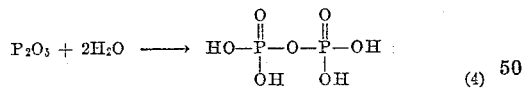
(4)

In other words, thus the polyphosphoric acid of this invention may be defined by means of the amount of $P_2O_5$ used. That is, in the foregoing Formula 2, that $n$ is zero indicates the amount of $P_2O_5$ used corresponds with the theoretical amount of use of $P_2O_5$ in the Formula 3. If in that case the amount of $P_2O_5$ used is said to be 100%, then that $n$ is greater than zero in the Formula 2 means that the amount of use of $P_2O_5$ in the Formula 3 is greater than 100%.

In this invention, according to the foregoing definition, particularly preferred polyphosphoric acid is the product of the reaction wherein the amount of $P_2O_5$ used is specifically around 116%.

However of course the polyphosphoric acid useful in this invention is not limited to that prepared by the reactions of the foregoing Formulae 2 and 4, but may be any polyphosphoric acid of the formula

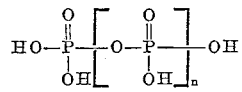

wherein $n$ is, as an average value, a positive integer greater than 0 and not more than 6, which moreover is a liquid under 100–250° C.

Said polyphosphoric acid is used both as condensing agent of the aromatic tetramines and dicarboxylic acids and as solvent for the starting materials and polymer in this invention.

Thus the polyphosphoric acid serving not only as condensing agent but also as solvent, in this invention it is preferred to use the polyphosphoric acid 5–40 times, particularly 15–30 times, by weight of the acid salt of aromatic tetramine.

This invention thus may be carried out at 100–250° C., preferably 180–220° C. when the dicarboxylic acid is aromatic type, and 120–160° C. when it is aliphatic type, under normal or reduced pressure.

Again, while the reaction of this invention will proceed under the presence of air or oxygen, if possible, absence of air or oxygen is preferred. Therefore in this invention it is particularly preferred to carry out the process under an inert gas atmosphere, such as carbon dioxide or nitrogen.

The reaction is accomplished by dissolving an acid salt of an aromatic tetramine in polyphosphoric acid, adding thereto a dicarboxylic acid or its derivative and heating the mixture with stirring. The time necessary for completion of the reaction differs depending on the type of the dicarboxylic acid used. The completion of the reaction is indicated by rise in solution viscosity. And in all cases the reaction progresses quantitatively. After the reaction is completed, the resinous product is obtained by pouring the reaction mixture into water.

According to this invention, polyphosphoric acid acts as a solvent and as a condensing agent, and thereby high molecular polybenzimidazoles can be produced very easily at a higher yield and the reaction temperature is controlled also easily compared with known processes.

The high molecular polybenzimidazoles obtained by this invention have excellent thermal stability and also high resistance to solvents. The products are used for production of various shaped articles having high thermal stability such as fibers, films and other heat-resistant materials.

Now the process of this invention shall be explained with reference to the following examples. However it should be understood that they are merely intended in an illustrative sense, and the invention should not be limited thereby, but only insofar as the same may be limited by the appended claims.

*Example 1*

Into a three-necked flask equipped with a stirrer, a nitrogen inlet and a gas outlet tube, 60 g. of 116% polyphosphoric acid were placed, and heated at 140° C. under stirring in $N_2$ current. To the same 2.0 g. of 3,4,3',4',-tetraminodiphenyl-tetrahydrochloride $$(C_{12}H_{14}N_4 \cdot 4HCl \cdot 2H_2O)$$

were added, dissolved and degassed. To this solution, 0.8 g. of isophthalamide was added, and the temperature was raised. After 12 hours of continuous heating at 200° C., the reaction mixture became viscous. Then the solution was poured into water, washed with water, then with alkaline water, and thereafter filtered and dried. 1.5 g. of a yellowish brown, resinous product were obtained. The reduced specific viscosity ($\eta_{sp}/C$.) of the polymer, in concentrated sulfuric acid at 30° C. and at a concentration of 0.2 g./100 ml., was 1.68. The polymer had fiber- and film-forming ability.

*Examples 2–33*

The examples of reaction between 3,4,3',4'-tetramino diphenyl-tetrahydrochloride and various dicarboxylic acid derivatives are shown hereinbelow. The reaction operations are similar to those of Example 1.

| Example No. | Dicarboxylic acid derivative (g.) | Tetra-mino-hydro-chloride (g.) | Poly-phosphoric acid (g.) | Reaction conditions (° C./hr.) | $\eta_{sp}/C.$* |
|---|---|---|---|---|---|
| 2 | Isophthalic acid, 0.85 | 2.0 | 53 | 170/4.5 and 200/17 | 1.38 |
| 3 | Dimethyl isophthalate, 1.0 | 2.0 | 63 | 140/7 and 180/24 | 0.37 |
| 4 | Diphenyl isophthalate, 1.6 | 2.0 | 55 | 200/11 | |
| 5 | Isophthaloyl chloride, 1.0 | 2.0 | 56 | 160/6.5 and 200/8 | 0.19 |
| 6 | Isophthalamide, 0.8 | 2.0 | 58 | 160/8 and 260/9 | 0.49 |
| 7 | Isophthalamide, 0.82 | 2.0 | 56 | 200/25.5 | 1.25 |
| 8 | Isophthalic dihydrazide, 0.95 | 2.0 | 63 | 260/23 | |
| 9 | Isophthalonitrile, 0.65 | 2.0 | 51 | 200/30 | 0.55 |
| 10 | Terephthalic acid, 0.85 | 2.0 | 59 | 200/20 | 0.54 |
| 11 | Dimethyl terephthalate, 1.0 | 2.0 | 57 | 200/2 | 2.76 |
| 12 | do | 2.0 | 60 | 200/4.5 | 2.59 |
| 13 | Terephthalamide, 0.8 | 2.0 | 56 | 200/5.5 | 1.08 |
| 14 | Terephthalamide, 0.82 | 2.0 | 51 | 200/7.5 | 1.20 |
| 15 | 3,3'-diphenylmethane dicarboxylic acid, 1.3 | 2.0 | 64 | 200/7 | |
| 16 | 4,4'-diphenylether dicarboxylic acid, 0.65 | 1.0 | 30 | 160/5 and 200/7 | |
| 17 | Dimethyl-2,5-pyridine dicarboxylate, 1.0 | 2.0 | 62 | 180/18 | 0.17 |
| 18 | Oxamide, 0.45 | 2.0 | 56 | 100/7 and 120/21 | 0.06 |
| 19 | Adipic acid, 0.75 | 2.0 | 55 | 200/21.5 | 0.13 |
| 20 | do | 2.0 | 53 | 120/4 | |
| 21 | Adipamide, 0.73 | 2.0 | 52 | 140/6 and 160/16 | |
| 22 | Azelaic acid, 0.94 | 2.0 | 51 | 140/0.5 | 1.04 |
| 23 | Sebacic acid, 1.0 | 2.0 | 53 | 140/1 | 3.31 |
| 24 | Sebacic acid, 1.01 | 2.0 | 52 | 140/0.5 | 0.74 |
| 25 | Sebacamide, 1.0 | 2.0 | 51 | 140/6.5 and 160/7.5 | 0.11 |
| 26 | α,ω-Undecamethylene dicarboxylic acid, 1.23 | 2.0 | 54 | 140/1 | 0.79 |
| 27 | Diethyl-α,ω-eicosamethylene dicarboxylate, 2.1 | 2.0 | 55 | 150/6 and 160/7 | 0.06 |
| 28 | Fumaric acid, 0.6 | 2.0 | 56 | 160/8 and 260/13 | 0.58 |
| 29 | Fumaramide, 0.6 | 2.0 | 61 | 160/6 | |
| 30 | {Dimethyl isophthalate, 0.50 / Dimethyl terephthalate, 0.50} | 2.0 | 54 | 150/4 and 200/30 | 0.60 |
| 31 | {Isophthalamide, 0.42 / Terephthalamide, 0.42} | 2.0 | 52 | 200/28.5 | 1.35 |
| 32 | {Isophthalic acid, 0.42 / Sebacic acid, 0.51} | 2.0 | 50 | 160/21.5 | |
| 33 | {Dimethyl terephthalate, 0.49 / Sebacic acid, 0.51} | 2.0 | 57 | 140/6 and 160/7.5 | 0.37 |

*In the above table, the reduced specific viscosity ($\eta_{sp}/C.$) is the value obtained in concentrated sulfuric acid at 30° C., at a concentration of 0.2 g./100 ml.

We claim:

1. Process for preparation of polybenzimidazoles which comprises heating at least one acid salt of an aromatic tetra-primary amine wherein two groups each of primary amines are present at the ortho-position of the aromatic nucleus and all of the said amines are combined with an inorganic acid or acids to form their salt, together with at least one dicarboxylic acid or its functional derivative in polyphosphoric acid of the formula:

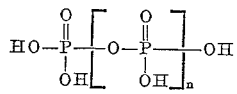

wherein $n$ is, as an average value, a positive integer greater than 0 but not more than 6 at a temperature of 100° C.–250° C. until the polycondensation reaction is completed.

2. Process in accordance with claim 1, wherein said acid salt of aromatic tetra-primary amine is an inorganic acid salt of an aromatic tetra-primary amine.

3. Process in accordance with claim 2, wherein dicarboxylic acid or its derivative is used in an amount of 0.8–1.2 mol, preferably about 1 mol, per 1 mol of inorganic acid salt of aromatic tetra-primary amine.

4. Process in accordance with claim 2, wherein the polyphosphoric acid is used 5 to 40 times by weight of inorganic acid salt of aromatic tetra-primary amine.

5. Process in accordance with claim 2, wherein the derivative of dicarboxylic acid is selected from the group consisting of lower aliphatic esters, aromatic esters, cycloaliphatic esters, halides, nitriles, amides, or hydrazides of dicarboxylic acids.

References Cited by the Examiner

UNITED STATES PATENTS 2,483,513  10/1949  Allen et al. _____ 260—78
2,895,948   7/1959  Brinker et al. _____ 260—78 X

OTHER REFERENCES

Vogel et al.: Journal of Polymer Science, vol. 50, pp. 511–539.

JOSEPH L. SCHOFER, *Primary Examiner.*

J. KIGHT, L. G. CHILDERS, *Assistant Examiners.*